United States Patent [19]

Donohoe

[11] Patent Number: 4,706,540

[45] Date of Patent: Nov. 17, 1987

[54] TEAR RESISTANT DRUM HEAD ASSEMBLY

[76] Inventor: David G. Donohoe, Rte. 2, Box 276, Springville, Calif. 93265

[21] Appl. No.: 1,138

[22] Filed: Jan. 7, 1987

[51] Int. Cl.[4] ............................................ G10D 13/02
[52] U.S. Cl. .................................................... 84/414
[58] Field of Search ................................. 84/411–420

[56] References Cited

U.S. PATENT DOCUMENTS

| | | | |
|---|---|---|---|
| 1,809,050 | 6/1931 | Logan | 84/414 |
| 2,018,182 | 10/1935 | Logan | 84/414 |
| 2,667,098 | 1/1954 | McMullen | 84/414 |
| 4,282,793 | 8/1981 | Muchnick | 84/414 |
| 4,362,081 | 12/1982 | Hartry | 84/414 |

*Primary Examiner*—Lawrence R. Franklin
*Attorney, Agent, or Firm*—Henderson & Sturm

[57] ABSTRACT

A tear resistant drum head assembly (10) comprising a primary layer (11) of contiguous synthetic material (15) and a secondary layer (12) of scored synthetic material (15') secured within a rigid support member (13); wherein, the primary layer (11) is laminated to the secondary layer (12) and the scoring pattern (17) of the secondary layer (12) comprises at least one penetrating cut through the thickness of the secondary layer material (15'); wherein, the secondary layer synthetic material (15') resists tearing in a direction generally perpendicular to an edge of the material.

7 Claims, 7 Drawing Figures

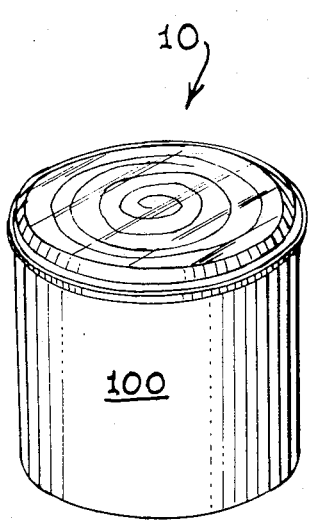
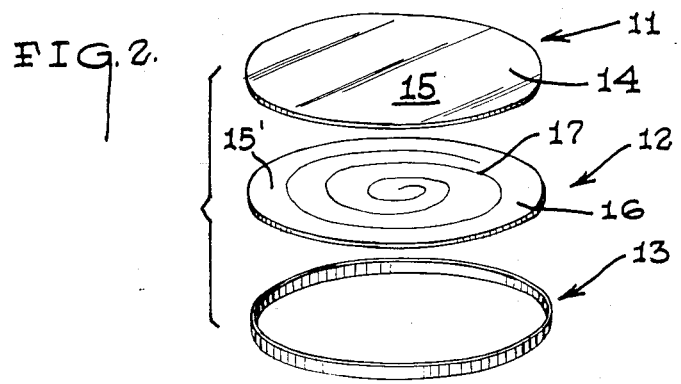
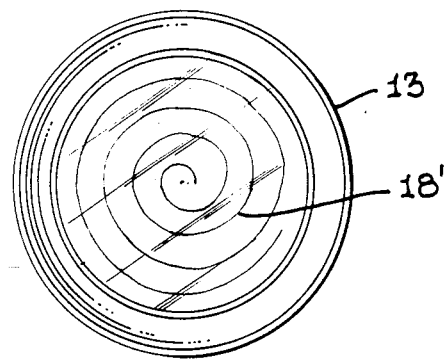
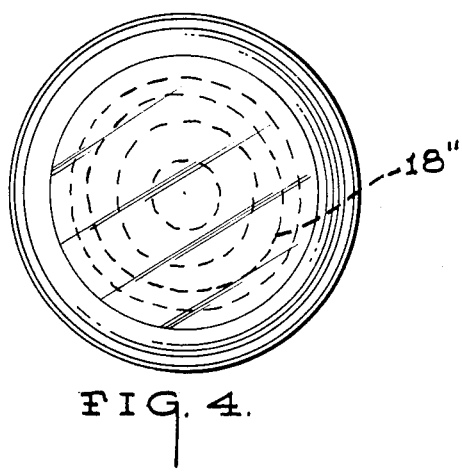
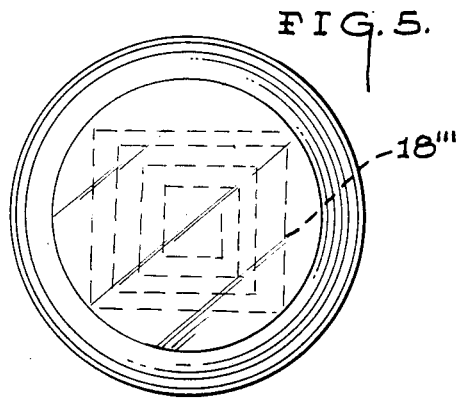
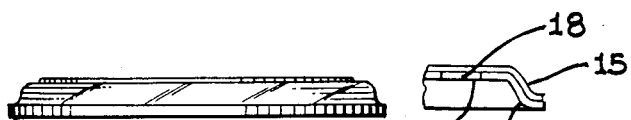
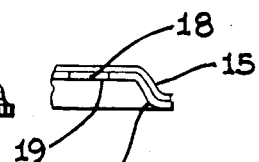

TEAR RESISTANT DRUM HEAD ASSEMBLY

TECHNICAL FIELD

The present invention relates to drum head assemblies in general, and more specifically to tear resistant drum head assemblies.

BACKGROUND OF THE INVENTION

Drums are undoubtedly one of the oldest percussion instruments known to mankind, and up until modern times drum heads have been fabricated from stretched animal skins. With the onset of modern technology man made fabrics have been substituted for the animal skins of yore with varying degrees of success.

The most recent advancement in this area of technology involves the use of single and double layered synthetic materials such as plastic and the like; and, at the cutting edge of this technology is the use of Mylar in conjunction with both like and dissimilar materials in a laminated arrangement.

Polyester film such as Mylar has outstanding tensile and impact strength characteristics; however, if a crack or tear develops in the polyester film the drum head will quickly be rendered inoperative, due to to the fact that the polyester film possesses very little tear resistance.

In an effort to achieve an improvement in durability, some manufacturers have produced a two-ply polyester film head. Although this improves durability somewhat in terms of impact, it does not solve the problem of tearing. Once a tear develops one or both plys split immediately thus rendering the head useless.

Other prior art attempts have included laminating cloth, fiberglass cloth or other woven materials to a Mylar drum head. This approach has the disadvantage of degrading resonance, feel and sound properties. It also does nothing to aleviate the problem of tearing.

Inasmuch as these prior art solutions have not produced satisfactory results, there has obviously existed a strongly felt need for a new approach to the construction of a drum head assembly; wherein, the tensile and impact strength of polyester film is retained, while a tear resistance is imparted to this material without materially altering the sound, feel, sensitivity and resonance of the polyester film.

Such an improved drum head construction comprises the subject matter of the present invention.

SUMMARY OF THE INVENTION

The present invention involves a two-ply laminated drum head assembly construction; wherein, the primary layer comprises an integral sheet of polyester film and the secondary layer comprises a scored sheet of polyester film.

As mentioned earlier on in the specification, polyester film has very little tear resistance in the direction of the tear; however, under normal circumstances it is very difficult to initiate a tear perpendicular to the severed edge of the polyester film material.

By joining the two-plys of polyester film together such as by heat, pressure and/or adhesives, any tear that is created in the primary layer will expand only to the point where the tear encounters a score in the secondary layer; whereupon, the secondary layers resistance to tearing along the edge of the score will preclude further tearing in the primary layer.

In addition, the scoring patterns that are impressed in the secondary layer are chosen such that a tear in the primary layer would have to exactly coincide with the direction of the score, for the tear in the primary layer to migrate beyond its initial point of contact with the secondary layer score.

The singularly unique aspect of this invention involves the fact that an inherent structural weakness of a single-ply of polyester film has been converted into an asset when combined with a second-ply of polyester film; wherein, one of the two-plys is structurally weakened by score lines. The structurally weakened layer in turn substantially enhances the tear resistant characteristics of the composite laminate; thereby creating an improved drum head construction.

BRIEF DESCRIPTION OF THE DRAWINGS

These and other objects, advantages and novel features of the invention will become apparent from the detailed description of the best mode for carrying out the preferred embodiment of this invention which follows; particularly when considered in conjunction with the accompanying drawings, wherein:

FIG. 1 is a perspective view of the tear resistant drum head installed on a conventional drum body;

FIG. 2 is an exploded perspective view of the preferred embodiment of the drum head assembly;

FIG. 3 is a top plan view of the drum head assembly of FIG. 2;

FIG. 4 is a top plan view of an alternate embodiment of the drum head assembly;

FIG. 5 is a top plan view of another alternate embodiment of the drum head assembly;

FIG. 6 is an enlarged cross-sectional view of the two-ply drum head assembly; and FIG. 7 is an enlarged sectional view of the edge of the drum head assembly shown in FIG. 6.

BEST MODE FOR CARRYING OUT THE INVENTION

As can be seen by reference to the drawings, and in particular to FIGS. 1 thru 3; the drum head assembly of this invention is designated generally by reference numeral (10) and is designed for use in combination with a conventional drum body (100). The drum head assembly (10) comprises in general a primary layer (11) a secondary layer (12) and a rigid support member (13). These structural components will now be described in seriatim fashion.

As can best be seen by reference to FIG. 2, the primary layer (11) comprises a thin generally circular contiguous sheet (14) of synthetic material (15); wherein, the synthetic material (15) comprises a polyester film, such as Mylar or the like.

The secondary layer (12) comprises a thin generally circular scored sheet (16) of synthetic material (15'); wherein, the synthetic material (15') also comprises a polyester film, such as Mylar, or the like. The only structural difference between the primary layer (11) and the secondary layer (12) being a scoring pattern (17) formed in the synthetic material (15') of the secondary layer (12). The scoring pattern (17) is formed by at least one penetrating cut (18) through the thickness of the material (15'); which, in turn creates adjacent edges (19) of the material (15') that are spaced inwardly from the periphery of the secondary layer (12) as can be seen in FIG. 7.

In the preferred embodiment of the invention illustrated in FIGS. 1 thru 3, the scoring pattern (17) comprises a single elongated spiral cut (18') originating proximate the midpoint of the secondary layer (12) to a location adjacent, and generally parallel to, the periphery of the secondary layer (12).

In the alternate embodiment of the invention illustrated in FIG. 4, the scoring pattern (17) comprises a plurality of generally arcuate cuts (18") arranged into a quasi-concentric circle arrangement.

In the other alternate embodiment of the invention illustrated in FIG. 5, the scoring pattern (17) comprises a plurality of straight cuts (18'") arranged in a diminishing and disconnected generally rectangular arrangement.

The drum head assembly (10) is created by sealingly securing the secondary layer (12) to the underside of the primary layer (11) by any suitable laminating technique such as heat, pressure, adhesives or any combination thereof. Once the primary (11) and secondary layers are joined together, the peripheral edges of the laminated layers are then secured within the rigid support member (13), which is subsequently attached to the conventional drum body (100) in a well recognized manner.

It should be appreciated at this juncture that a drum head assembly (10) built in accordance with the foregoing teachings, will produce a tear resistant drum head; wherein, if a crack develops in both the primary (11) and secondary (12) layers, such as from striking the drum head too close to the edge, the crack will only migrate to the nearest penetrating cut (18) in the secondary layer (12). Once the crack reaches the cut (18), the normal tendency of the crack to continue to expand across the primary layer (11) will be counteracted by the secondary layer's (12) inherent resistance to a tearing motion applied generally perpendicular to an edge of the material (15').

Having thereby described the subject matter of this invention, it should be obvious that many substitutions, modifications, and variations of the invention are possible in light of the above teachings. It is therefore to be understood that the invention as taught and described herein is only to be limited to the extent of the breadth and scope of the appended claims.

I claim:

1. A tear resistant drum head assembly for use in combination with a conventional drum body; wherein, the drum head assembly comprises:
   a primary layer comprising a thin generally circular continuous sheet of synthetic material;
   a secondary layer comprising a thin generally circular scored sheet of synthetic material; wherein, the secondary layer is laminated to the underside of the primary layer and the peripheral edges of the primary and secondary layers are joined together; and,
   a rigid support member adapted to secure the peripheral edges of the primary and secondary layers; wherein, the rigid support member forms the operative connection between the drum head assembly and the drum body.

2. The drum head assembly of claim 1; wherein, the synthetic material comprises a polyester film.

3. The drum head assembly of claim 1; wherein, the synthetic material of the secondary layer is provided with a scored pattern formed by at least one penetrating cut through the thickness of said synthetic material.

4. The drum head assembly of claim 3; wherein, the at least one penetrating cut comprises an elongated spiral cut originating proximate the midpoint of said secondary layer.

5. The drum head assembly of claim 1; wherein, the synthetic material of the secondary layer is provided with a scored pattern formed by a plurality of penetrating cuts through the thickness of said synthetic material.

6. The drum head assembly of claim 5; wherein, said plurality of penetrating cuts are arcuate cuts.

7. The drum head assembly of claim 5; wherein, said plurality of penetrating cuts are straight cuts.

* * * * *